United States Patent
Swiatkowski et al.

[11] Patent Number: 5,674,340
[45] Date of Patent: Oct. 7, 1997

[54] INSULATING TAPE FOR THE WINDING OF AN ELECTRIC MACHINE

[75] Inventors: Gernot Swiatkowski; Irene Olbrich, both of Berlin, Germany

[73] Assignee: Siemens Aktiengesellschaft, Munich, Germany

[21] Appl. No.: 387,939
[22] PCT Filed: Aug. 24, 1993
[86] PCT No.: PCT/DE93/00790
  § 371 Date: Feb. 27, 1995
  § 102(e) Date: Feb. 27, 1995
[87] PCT Pub. No.: WO94/05018
  PCT Pub. Date: Mar. 3, 1994

[30] Foreign Application Priority Data

Aug. 25, 1992 [DE] Germany ............ 92 25 02 26.5

[51] Int. Cl.$^6$ ............ B65H 81/00; B32B 31/26; B32B 7/12
[52] U.S. Cl. ............ 156/184; 156/185; 156/307.7; 310/43; 310/45; 310/179; 428/343; 174/110 R
[58] Field of Search ............ 428/343, 354, 428/355; 310/179, 43, 45; 174/110 R; 156/184, 185, 307.7; 336/205, 206

[56] References Cited

U.S. PATENT DOCUMENTS

| | | | |
|---|---|---|---|
| 3,560,320 | 2/1971 | Letteron | 161/93 |
| 3,586,557 | 6/1971 | Rogers, Jr. | 156/85 |
| 3,695,984 | 10/1972 | Rogers, Jr. | 161/93 |
| 3,808,086 | 4/1974 | Mosimann et al. | 428/286 X |
| 4,769,276 | 9/1988 | Gruss et al. | 428/343 X |
| 5,079,077 | 1/1992 | Sakayanagi et al. | 428/355 X |
| 5,099,159 | 3/1992 | Liptak et al. | 310/45 |
| 5,158,826 | 10/1992 | Ihlein et al. | 428/355 X |

FOREIGN PATENT DOCUMENTS

| | | |
|---|---|---|
| 0 012 566 | 6/1980 | European Pat. Off. . |
| 0 355 558 | 2/1990 | European Pat. Off. . |
| 2 427 673 | 12/1979 | France . |
| 1 273 647 | 7/1968 | Germany . |
| 1 817 563 | 8/1969 | Germany . |
| 31 21 725 | 12/1982 | Germany . |
| 89 05 612 | 7/1989 | Germany . |
| 32 34 792 | 3/1994 | Germany . |
| 0 493 070 | 8/1970 | Switzerland . |

*Primary Examiner*—Daniel Zirker
*Attorney, Agent, or Firm*—Kenyon & Kenyon

[57] ABSTRACT

An insulating tape for the winding of an electric machine, in particular a rotary machine, may include an electric breakdown-resistant material, such as mica, of a support material, such as glass silk, and a thermoplastic adhesive for holding together the insulating tape. The adhesive may be a thermoplastic material having a continued use temperature at least one insulation class lower than the insulation class provided for the winding. The machine insulation has the required mechanical and electric stability after the winding insulation is impregnated with a hardenable resin.

5 Claims, 2 Drawing Sheets

INSULATING TAPE FOR THE WINDING OF AN ELECTRIC MACHINE

BACKGROUND OF THE INVENTION

The present invention relates to the use of an insulating tape for insulating first insulation class windings of electric machines with the insulating tape, consisting of a support material, an electric breakdown-resistant material, and a thermoplastic adhesive, impregnated with a resin and subsequently hardened.

Such an insulating tape is disclosed, for example, in German Auslegeschrift Patent Document No. 12 73 647. A greater mechanical strength and better electric breakdown resistance should be achieved, however, according to the German Auslegeschrift, through the use of a vulcanizable adhesive.

German Patent Document No. 89 05 612.4 discloses an insulating tape with a thermoplastic adhesive consisting of a polyether sulfone or a polyether imide. The disadvantage of these thermoplastic materials is that they must be either heated to a high temperature in order to be applied on the tape or dissolved in special solvents in order to be sprayed on the tape.

U.S. Pat. Nos. 3,695,984 and 3,586,557 disclose a process of using a thermoplastic adhesive in the form of a foil for an insulating tape. In these patents, a foil is used, which after being wound on a conductor, contracts when heated, so that openings are formed for the passage of an impregnating resin between the different layers of the insulating tape.

German Offenlegungsschrift Patent Document No. 31 21 725 discloses the use of different thermoplastic materials in the form of foils as insulating layers between the windings of an electrical machine is known. There the thermoplastic foil itself forms the insulating medium; therefore no additional mica layer is provided. Polyamide, polyimide and polyester materials, for example, are proposed.

It is, however, expressly emphasized in German Patent Document No. 31 21 725 that, when selecting the appropriate thermoplastic foil for an electric machine, the heat resistance of the foil material must be selected according to the insulation class of the machine to be insulated.

European Patent Document No. EP 0 012 566 discloses at page 2, lines 1 through 34, a silicone resin adhesive for an insulation class H (>180° C.) insulating tape. This reference discloses that the heat resistance of the insulating tape is insufficient when a solvent-free silicone resin is used.

The required heat resistance is only achieved in European Patent Document No. EP 0 012 566 by using a silicone resin with hydroxyl groups as an adhesive, since the adhesive itself (see p. 2, line 20 of EP 0 012 566) has the required heat resistance due to its siloxane bonds. Thus such a special high-temperature-resistant silicone resin prevents the winding from delaminating due to mechanical changes in the adhesive, or degassing.

Swiss Patent Document No. 493070 discloses (see Description Introduction, col. 1 to col. 2, line 2) that thermoplastic adhesives (bonding agents) warm up and soften during the operation of electric machine, which causes its insulation to swell and its dielectric properties to deteriorate.

Thus both thermoplastic and non-thermoplastic adhesives are known from the literature for use in insulating tapes for the windings of electric machines. It is furthermore known that the adhesives themselves should have sufficient heat stability at the temperature at which the electric machine should operate.

Nevertheless, since, on the one hand, silicone resins are expensive and, on the other hand, thermoplastic materials with very high continued use temperatures are difficult to process (high processing temperatures, vapors with possibly harmful physiological effects, brittleness), a problem consists of providing an adhesive that is inexpensive and simple to process and yet yields a high-temperature resistant winding insulation that is protected against delamination. A good adhesive action at the eventual operating temperature of the electric machine is not essential.

SUMMARY OF THE INVENTION

"Delaminating" is defined in this context as the deterioration of the mechanical and dielectric properties of the winding insulation, especially through mechanical changes or degassing of materials and formation of cavities inside the insulation.

The adhesive may be required to be soluble in conventional solvents with no possibly harmful physiological effects.

This is achieved according to the present invention by using an insulating tape of the aforementioned type, in which the adhesive basically consists of a material whose maximum continued use temperature is at least one insulation class lower than the upper limit temperature of the first insulation class.

The maximum continued use temperature of a material is defined in this context as the highest temperature at which the material can be continuously used without fundamentally changing its mechanical or electric properties. Insulation classes are understood to be the insulation classes as defined by IEC Standard 85.

Such an adhesive can be calendared in a simple manner at a low temperature using a tape made of an electric breakdown-resistant material, for example, mica, and a tape made of a support or reinforcing material, such as glass silk. It is, however, also conceivable to dissolve the adhesive in a conventional solvent and spray it onto the tape made of an electric breakdown-resistant material or onto a band made of a support material or both. The thermoplastic materials that may be considered are relatively inexpensive, since they do not have to have a high continued use temperature. In addition, the adhesives can be stored for a long period and are flexible, i.e., easily processed.

After applying the insulating tape to a winding, impregnating with a resin and hardening, the winding insulation has the electrical and mechanical strength required for the machine even above the continued use temperature of the adhesive material despite the low value of this parameter.

The present invention can be advantageously implemented with the adhesive consisting basically of a polyurethane, a saturated polyester, a polyacrylate, a polymethacrylate, a styrene polymerizate, a polyamide, a polyvinyl ether, a polyvinyl acetate or a mixture of a plurality of these substances.

The aforementioned substances have good adherence, in addition to the above-explained properties.

A further advantageous embodiment of the present invention provides for mixing the adhesive with an accelerator.

The accelerator causes the impregnating resin, with which the insulating tape is impregnated after being applied to the winding, to harden quickly in the proximity of the insulating tape. An additional process step for applying the accelerator is avoided by applying the accelerator jointly with the adhesive.

Furthermore, the present invention can be implemented by applying an accelerator to the insulating tape independently of the adhesive.

This can be especially important when the accelerator should be metered independently of the adhesive.

Another advantageous embodiment of the present invention provides an accelerator containing tertiary amines, imidazoles, quaternary ammonium salts, Lewis acids, Lewis bases, phosphonium salts, piperazines, organometallic compounds or a mixture of a plurality of these substances.

The present invention furthermore relates to an electric machine with a winding designed for a first insulation class, which is insulated with an insulating tape used according to the invention.

Such electrical machines can be, for example, motors, generators, or transformers. The present invention will be clarified in greater detail in the following description on the basis of an exemplary embodiment.

BRIEF DESCRIPTION OF THE DRAWINGS

Other advantages and embodiments of the present invention are discussed in the following written description in conjunction with the attached drawings.

DETAILED DESCRIPTION

Mica tapes are manufactured from mica, glass silk and a thermoplastic polyurethane adhesive (Desmocoll 176 by Bayer) using a laminating machine. The adhesive, in the form of a solution, is applied to the mica paper and the latter is then brought together with glass silk. A solution with 13 wt. % polyurethane adhesive in methylethylketone was used. The adhesive layer applied contains approximately 12 g/m$^2$. For subconductor insulation a phlogopite mica with a surface density of 90 g/m$^2$ is used; for the main insulation a muscovite mica with a surface density of 160 g/m$^2$ is used.

Weight loss is determined on the mica tape laminates impregnated with an isocyanate/epoxy impregnating resin at 80° C. using a vacuum impregnating method. A 24 mm wide mica tape is coated with the BCl$_3$DMBA accelerator (0.5 g/sq.m) and glued to a glass silk fabric with Bayer's polyurethane adhesive Desmocoll 176. Test specimens consisting of 12 layers of 16 cm long mica tape are prepared.

The impregnated laminates are stored for 64 weeks in an atmosphere of nitrogen at 180°, 200°, and 220° C.

The following weight losses, calculated on the impregnating resin/adhesive resin component were obtained (in percent by weight):

| Storage Temperature | 1 Week | 4 Weeks | 16 Weeks | 32 Weeks |
| --- | --- | --- | --- | --- |
| 180° C. | 0.08 | 0.14 | 0.31 | 0.64 |
| 200° C. | 0.15 | 0.35 | 1.30 | 2.04 |
| 220° C. | 0.53 | 1.55 | 3.47 | 5.52 |

At storage temperatures of 180° and 200° C., the weight loss remains within reasonable limits. A higher weight loss would be a sign that the adhesive decomposes and degasses at higher temperatures. This decomposition results in bubble and cavity formation and the associated deterioration of the dielectric and mechanical properties (delamination) of a winding insulation manufactured with the adhesive.

The laminate remains otherwise stable mechanically and in this temperature range has the required mechanical and electric stability characteristics required for its use as an insulator. Thus the Desmocoll 176 polyurethane adhesive can be used for insulation class H windings, although it has a maximum continued use temperature of only approximately 90° C. itself.

In another series of experiments, the temperature characteristics of laminate samples manufactured with thermoplastic tape adhesive (an unsaturated polyester) were compared to the temperature characteristics of laminate samples manufactured with a silicone tape adhesive.

FIGS. 1 through 4 show the corresponding test results, which are explained below. Tables 1 through 3 contain, in table form, the values plotted on the graphs of FIGS. 1 through 4; specifically, Table 1 contains the values of FIGS. 1 and 2, Table 2 the values of FIG. 3, and Table 3 the values of FIG. 4.

Figure 1:
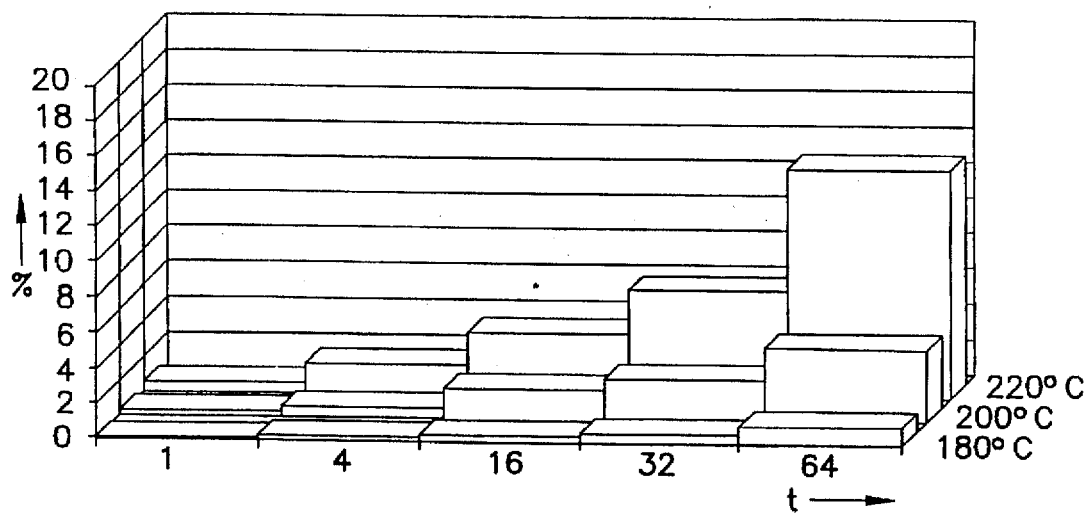
FIG. 1 illustrates the weight loss of a laminate sample of a thermoplastic adhesive.

FIG. 1 shows the weight loss of the laminate sample of a thermoplastic adhesive (1), specifically a saturated polyester (maximum continued use temperature approximately 100° C.), in percent (y axis) plotted against the storage time for storage from 1 to 64 weeks in an atmosphere of nitrogen for three different temperatures, 180° C., 200° C., and 220° C. It can be seen that the weight loss for storage at 200° C. is still reasonable after 64 weeks' storage.

On the other hand, in the case of storage at 220° C., an excessive weight loss occurs, indicating delamination of the laminate samples.

Figure 2:
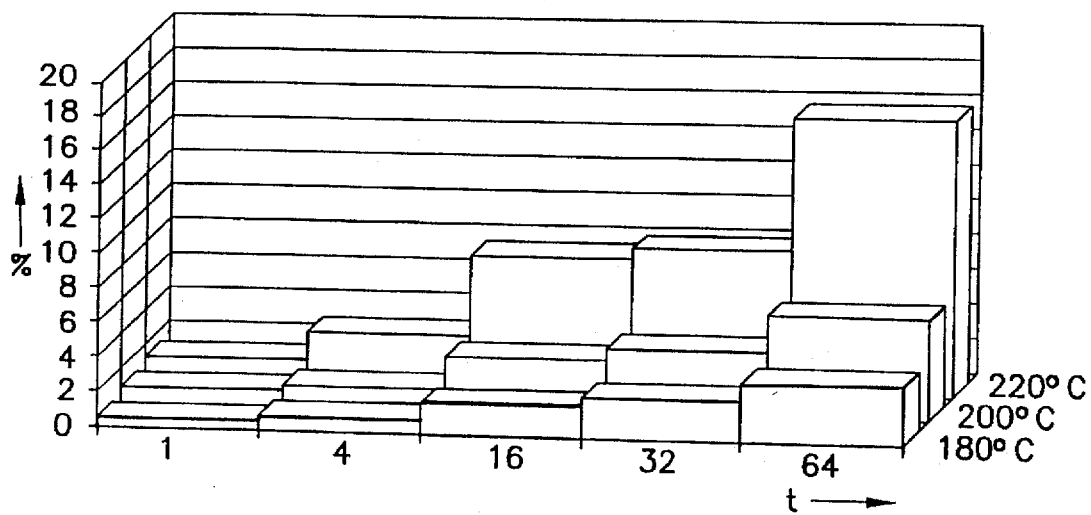
FIG. 2 illustrates the weight loss of a laminate sample of a silicon tape adhesive.

In comparison, a silicone tape adhesive (2) (DOW 994 by Dow Chemical) in the respective laminates provides higher weight losses (Table 1, FIG. 2) and even at 200° C. the weight loss is so high that delamination of the corresponding laminates is assumed (see FIG. 2, Table 1).

Figure 3:
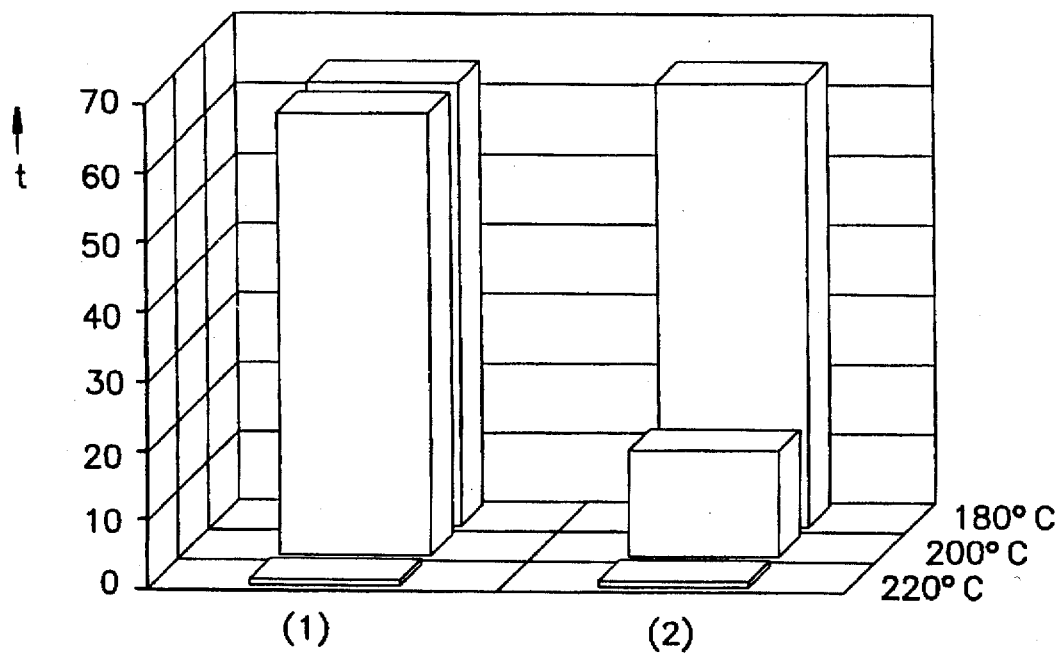
FIG. 3 illustrates the number of weeks for which the laminates manufactured using a thermoplastic tape adhesive remain stable at different temperatures.

Table 2 and FIG. 3 show the number of weeks for which the laminates manufactured using a thermoplastic tape adhesive (1) remain stable at different temperatures. FIG. 3 shows the time in weeks along the y axis. It can be seen that for a test period of 64 weeks, the samples stored at 180° C. and 200° C. are stable to the end of the test period and beyond.

FIG. 3 shows that, in the case of the laminates manufactured from silicone tape adhesive (2), only the laminates stored at 180° C. are stable for 64 weeks. The laminates stored at 200° C. no longer meet the specifications after a storage time of only 16 weeks.

The measured values shown in the tables of the Appendix correspond to the values shown in the diagrams of the corresponding figures.

The measurement of the dielectric loss factor tan $\delta$ has proven to be another reliable method for evaluating the delamination of a winding insulation. The following procedure provides especially significant results:

Different laminates are stored at different temperatures, which remain constant over a certain time period that is the same for all laminates (typically a few weeks). Then tan $\delta$ is measured according to VDE standard 530, Part 1 at different voltages ranging from 0.2 to 1.4 times the rated voltage of the winding insulation to be manufactured in steps corresponding to 0.2 times the rated voltage for each laminate. Then the difference between the tan $\delta$ values of two adjacent points determined this way is calculated for a laminate. The maximum difference between the tan δ values of two adjacent points obtained by this process for a laminate is designated as Δtan δ (max) of this laminate. A Δtan δ (max) value is determined this way for each laminate stored at 5 different temperatures.

The values are plotted in a graph against the storage temperature of the respective laminates. Typically a curve is obtained for which the Δtan δ (max) values plotted on the y axis increase first slightly and then, with increasing storage temperature, more steeply. Typically a temperature range, in which a very steep increase of the Δtan δ (max) value takes place can be determined. It has been shown that this characteristic of the Δtan δ (max) is a sign for delamination of the laminate in said temperature range.

Figure 4:
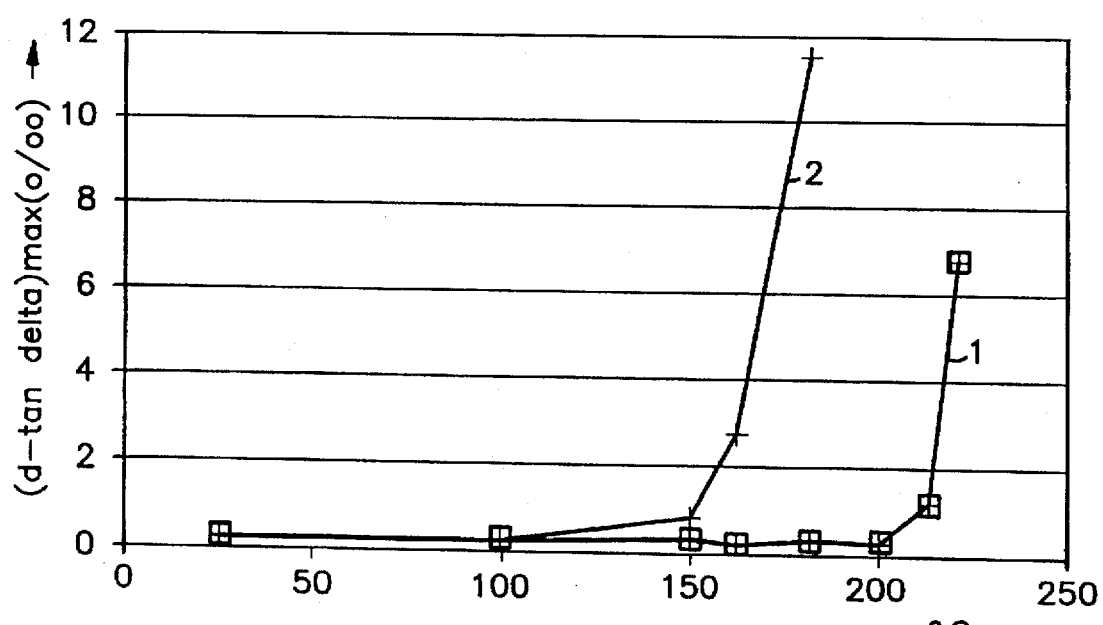
FIG. 4 illustrates the steep increase of the $\Delta \tan \delta$ (max) value as a function of temperature in °C.

Below two examples are given for the characteristics of laminates, with the first example concerning a laminate made of an insulating tape in which a saturated polyester (thermoplastic tape adhesive) was used as the adhesive and an epoxy-isocyanate system was used as the impregnating resin (see Appendix, FIG. 4, Table 3).

The result is that the steep increase of the Δtan δ (max) value only occurs at a temperature of 200° C. FIG. 4 shows the value in thousandths plotted (y axis) against the temperature in °C. (x axis). The value for the rated voltage of the insulation was determined to be $U_N=11$ kV at an insulation thickness of 1.95 min.

This means that the insulating tape made with saturated polyester as an adhesive, can be continuously exposed to temperatures up to 200° C. without delamination of the winding. This insulating tape can thus be used for electrical machines of insulation class H (>180° C.), although the adhesive should be expected to decompose above approximately 100° C.

The second example concerns the silicone resin adhesive (DOW 994), which was processed under the same conditions as the aforementioned polyester in a laminate as an adhesive. This substance is in itself stable up to about 220° C. After that the Δtan δ (max) value was found to increase steeply, which indicates delamination in this temperature range (see FIG. 4, Table 3).

TABLE 1

Weight Loss of Laminate Samples in %

| | Thermoplastic Tape Adhesive | | | Silicone Tape Adhesive | | |
|---|---|---|---|---|---|---|
| | 180° C. | 200° C. | 220° C. | 180° C. | 200° C. | 220° C. |
| 1 Week | 0.06 | 0.12 | 0.45 | 0.31 | 0.48 | 1.27 |
| 4 Weeks | 0.11 | 0.28 | 1.42 | 0.61 | 1.19 | 2.84 |
| 16 Weeks | 0.30 | 1.15 | 3.35 | 1.91 | 3.46 | 7.26 |
| 32 Weeks | 0.61 | 1.95 | 5.41 | 2.39 | 4.04 | 8.27 |
| 64 Weeks | 1.16 | 3.79 | 12.89 | 3.47 | 5.86 | 16.0 |

The weight losses are calculated on the impregnating resin/adhesive resin component in the laminate samples. The storage took place in an atmosphere of nitrogen.

TABLE 2

Break-up Behavior of Laminate Samples

| | Thermoplastic Tape Adhesive | | | Silicone Tape Adhesive | | |
|---|---|---|---|---|---|---|
| | 180° C. | 200° C. | 220° C. | 180° C. | 200° C. | 220° C. |
| Samples stable Weeks | 64 | 64 | 1 | 64 | 16 | 1 |

TABLE 3

Thermal-mechanical Stability of the Main Insulation

| | Thermoplastic Tape Adhesive Measurement after Storage 16 Hours at | Silicone Tape Adhesive (d-tan delta) max (0/00) |
|---|---|---|
| 25° C. | 0.2 | 0.3 |
| 100° C. | 0.2 | 0.2 |
| 150° C. | 0.3 | 0.9 |
| 160° C. | 0.2 | 2.8 |
| 180° C. | 0.3 | 11.5 |
| 200° C. | 0.2 | — |
| 210° C. | 1.3 | — |
| 220° C. | 6.7 | — |

Main insulation for $U_N = 11$ kV
Insulation thickness: 1.95 mm

We claim:

1. A method of manufacturing an electrical winding corresponding to at least one insulation class for a rotating electric machine, comprising:

a) producing an insulating tape comprising a support material, a thermoplastic adhesive and an electrically breakdown-resistant material, wherein the insulating tape is produced according to the steps of:

i) coating at least one of a layer of the support material and a layer of the electrically breakdown-resistant material with the thermoplastic adhesive;

ii) bonding together the layer of the support material and the layer of the electrically breakdown-resistant material;

iii) subjecting the bonded layers of the support material and the electrically breakdown-resistant material to a heat treatment; and iv) cutting the bonded layers of the support material and the electrically breakdown-resistant material into tapes;

b) winding the insulating tape around an electrical conductor;

c) impregnating the insulating tape with an impregnating resin; and d) hardening the insulating tape, wherein the thermoplastic adhesive is selected from the group of a polyurethane and a saturated polyester, wherein the thermoplastic adhesive is applied in liquefied form using a solvent, and wherein a mixture of an epoxy compound and an isocyanate compound is used as the impregnating resin.

2. The method according to claim 1, wherein, before the adhesive is applied on at least one of the layer of the support material and on the layer of the electrically breakdown-resistant material, the adhesive is mixed with an accelerator.

3. The method according to claim 1, wherein, after the bonding of the layer of the support material and the layer of the electrically breakdown-resistant material, an accelerator is applied on at least one of the layer of the support material and the layer of the electrically breakdown-resistant material.

4. The method according to claim 2, wherein the accelerator is selected from the group of tertiary amines, imidazoles, quaternary ammonium salts, Lewis acids, Lewis bases, phosphonium salts, piperazines, and organometallic compounds.

5. The method according to claim 3, wherein the accelerator is selected from the group of tertiary amines, imidazoles, quaternary ammonium salts, Lewis acids, Lewis bases, phosphonium salts, piperazines, and organometallic compounds.

* * * * *